United States Patent
Sindelar et al.

[11] 3,800,541
[45] Apr. 2, 1974

[54] BRAKE MASTER CYLINDER CUP SEAL WITH VALVE

[75] Inventors: Ernest C. Sindelar, Aurora; Duane R. Smith, Oswego, both of Ill.

[73] Assignee: Caterpillar Tractor Co., Peoria, Ill.

[22] Filed: Sept. 12, 1972

[21] Appl. No.: 288,402

[52] U.S. Cl.................. 60/588, 60/589, 417/511
[51] Int. Cl............................................. F15b 7/08
[58] Field of Search ............. 60/588, 589; 417/511; 92/24

[56] References Cited
UNITED STATES PATENTS

| | | | |
|---|---|---|---|
| 2,847,827 | 8/1958 | Johnson | 417/511 |
| 3,141,303 | 7/1964 | Baldwin | 60/588 |
| 3,558,244 | 1/1971 | Uchiyama | 417/511 |
| 1,379,492 | 5/1921 | Wagner | 417/511 |
| 2,136,835 | 11/1938 | Begg | 417/511 |
| 3,318,256 | 5/1967 | Green | 417/511 |
| 2,872,705 | 2/1959 | Labarre | 417/511 |
| 2,192,012 | 2/1940 | La Brie | 60/588 |
| 1,889,987 | 12/1932 | Heidloff | 60/588 |

*Primary Examiner*—Edgar W. Geoghegan
*Assistant Examiner*—A. M. Zupcic
*Attorney, Agent, or Firm*—Fryer, Tjensvold, Phillips & Lempio

[57] ABSTRACT

A brake master cylinder assembly having a piston cup seal equipped with a valve. The cup seal valve allows the rapid resupply of pressure fluid from the supply reservoir to the high-pressure chamber of the master cylinder at such times when there is little or no pressure in such chamber. The valve provides an unobstructed fluid flow passageway through the cup seal to the high-pressure chamber during bleeding of the brake system equipped with the master cylinder and permits the reservoir to supply replenishment fluid to the high-pressure chamber upon a retraction stroke of the piston.

10 Claims, 7 Drawing Figures

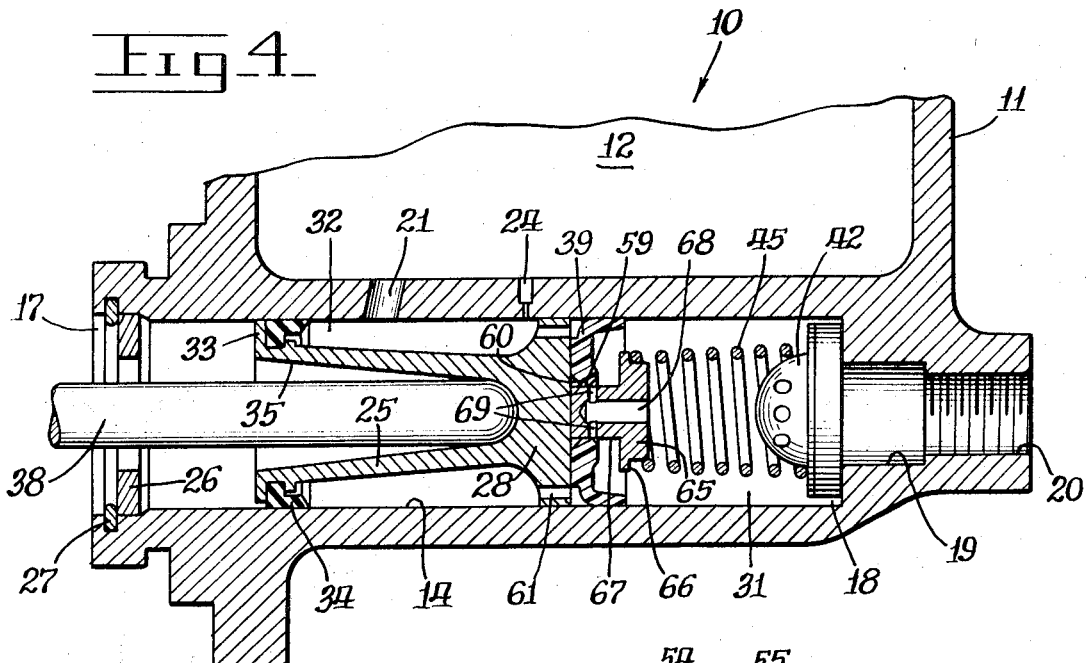
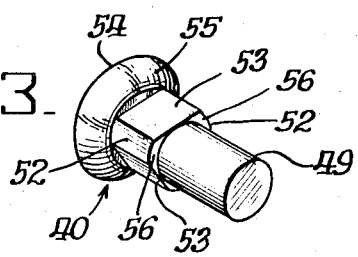
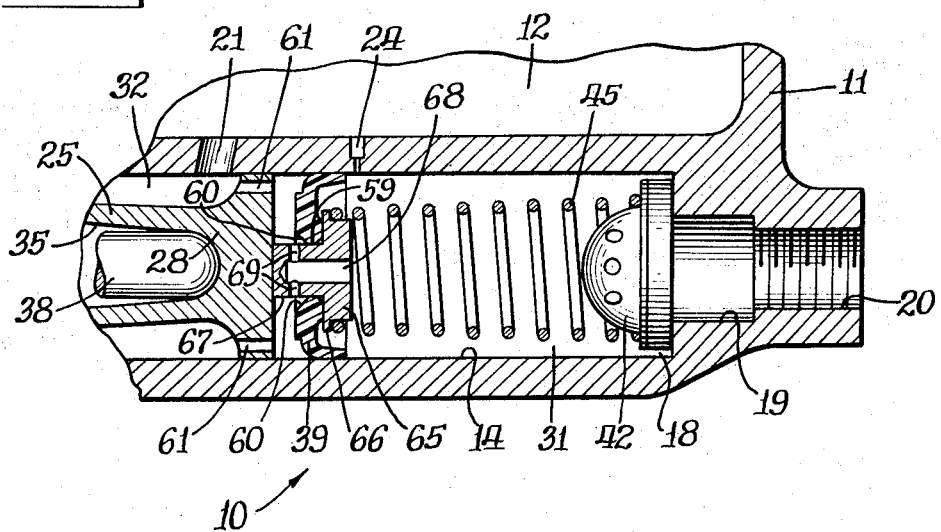

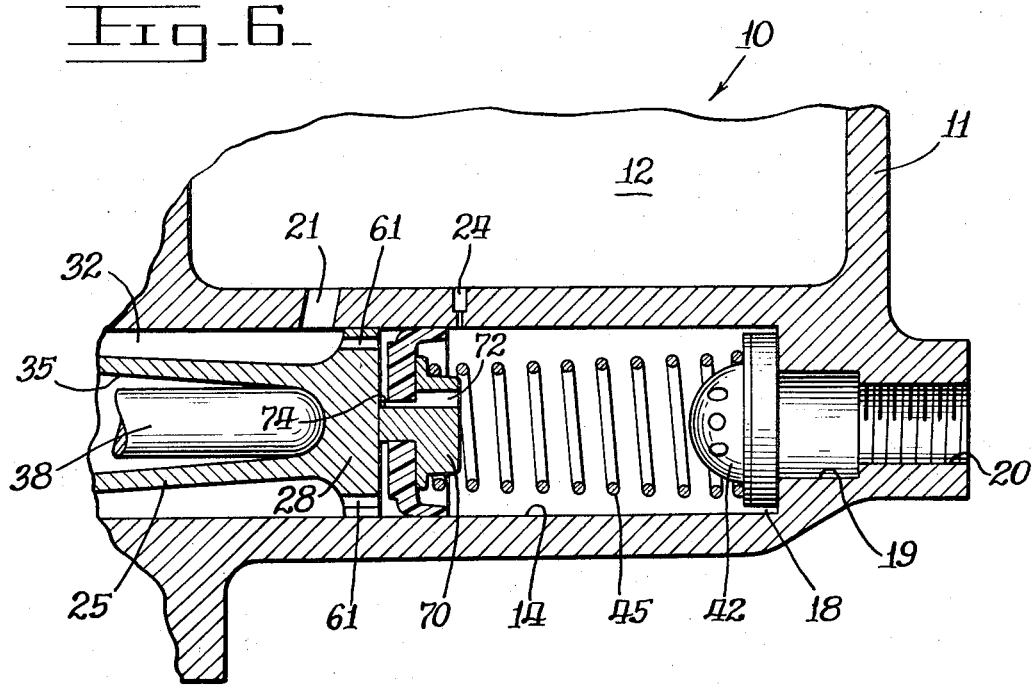
Fig-6-
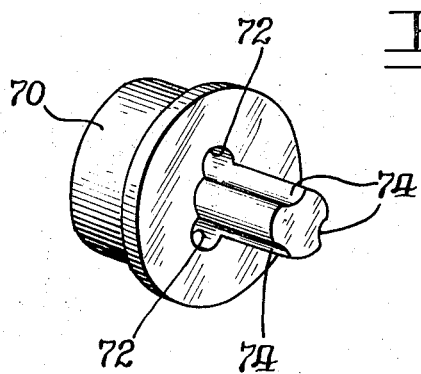
Fig-7-

3,800,541

BRAKE MASTER CYLINDER CUP SEAL WITH VALVE

BACKGROUND OF THE INVENTION

The present invention is intended to be an improvement over the general type of brake master cylinder cup seal arrangement disclosed in U.S. application Ser. No. 194,631, filed Nov. 1, 1971, of common assignment herewith.

One of the features provided by the assembly disclosed in such application was the separation of a free floating cup seal from a face of the master piston to allow, under normal operations, the flow of replenishment fluid from a supply reservoir to a make-up port and then to a high-pressure chamber disposed between the cup seal and the outlet end of the master cylinder.

At times, such as when brake system is bled, there will be little or no pressure in the high-pressure chamber of the brake master cylinder. Under these low-pressure conditions, desired separation of the cup seal from the piston face will be sluggish and the brake pedal will have to be stroked several times to permit the reservoir to replenish depleted fluid in the high-pressure chamber. Bleeding under such a procedure is time-consuming and generally requires two persons.

SUMMARY AND OBJECTS OF THE INVENTION

The present invention provides a master cylinder cup seal which solves the above-mentioned problem and which is equipped with a valve capable of providing an unobstructed free-flow path from the reservoir to the high-pressure chamber of the master cylinder at any time the master piston assembly is static. The invention, while providing free flow between the reservoir and the high-pressure chamber whenever the piston assembly is static, also insures a complete seal between the piston, the cup seal, and the cylinder bore whenever the piston assembly is stroked in a pumping direction.

An object of the present invention is to provide a piston cup seal having a passageway therethrough provided with a valve which passageway is held normally open by said valve but which is securely closed when the piston is actuated on a pumping stroke.

Other objects and advantages of the present invention will become apparent upon reference to the accompanying drawings and following description.

BRIEF DESCRIPTION OF THE DRAWINGS

FIG. 3 is an isometric view of a poppet valve utilized in the embodiment of the present invention shown in FIGS. 1 and 2;

FIG. 4 is a longitudinal sectional elevation taken generally through the center of master cylinder assembly illustrating a seal valve of alternate construction and showing the components of the assembly in a piston-actuated position;

FIG. 5 is a view similar to FIG. 2 but showing the cup seal valve illustrated in FIG. 4;

FIG. 6 is a view similar to FIG. 2 but showing another alternate construction for the piston seal valve of the present invention; and FIG. 7 is an isometric view of the seal valve illustrated in FIG. 6.

DETAILED DESCRIPTION

Figure 1:
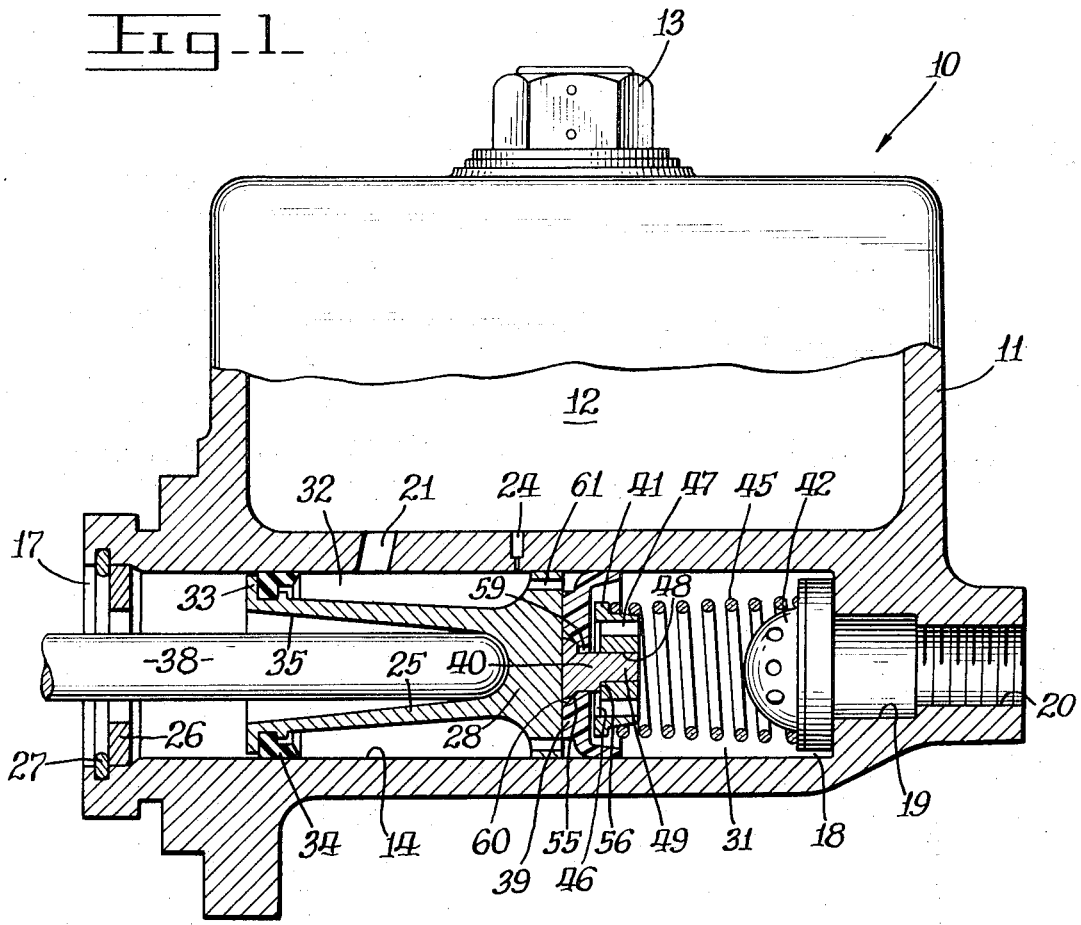
FIG. 1 is a longitudinal sectional elevation taken generally through the center of a master cylinder assembly showing the preferred embodiment of the present invention with the components thereof disposed in a piston-actuated position.
Figure 2:
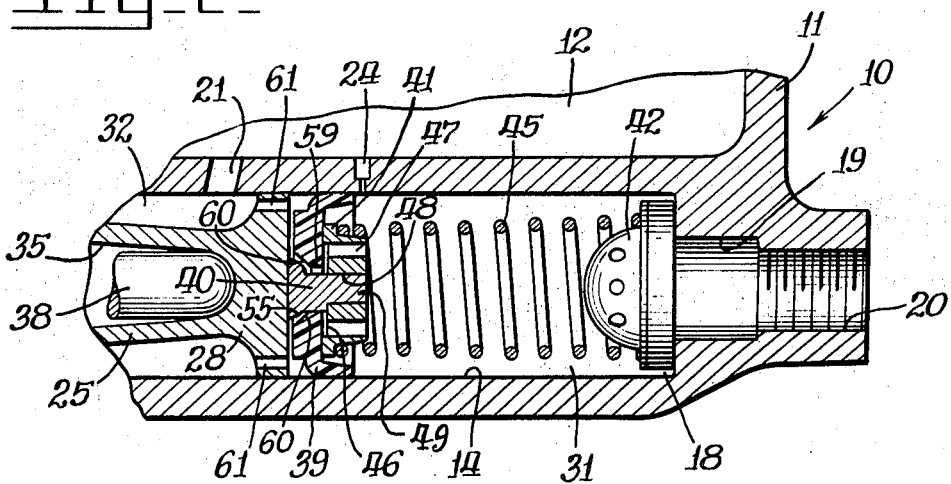
FIG. 2 is a fragmentary section of the master cylinder assembly of FIG. 1 but showing the components of the assembly in a piston-withdrawn or static condition, i.e., normal condition.

With reference to FIGS. 1 and 2 in the drawings, a complete brake master cylinder assembly is shown generally at 10. Such assembly includes a body 11 having a fluid supply reservoir 12 with a filler cap 13. Body part 11 has a bore 14 with an open end 17 and valved outlet end 18. The outlet end 18 communicates with a reduced diameter bore 19 which, in turn, communicates with a threaded coupling bore 20. The threaded bore 20 is adapted for connection to a plurality of lines or conduits which lead to the individual wheel cylinders (not shown) for the vehicle in which the present system is utilized. A make-up port 21 provides communication between the bore 14 and the reservoir 12. An axially-spaced metering orifice bypass port 24 is also provided as shown, and prevents the brakes from locking due to thermal expansion of the brake fluid. The ports 21 and 24 provide bore communication with the reservoir at different points during the axial travel of a master piston 25 within the cylinder.

The piston 25 is slideably contained within the bore 14 and is held therein by means of a retainer 26 and a snap ring 27. A flange portion 28 of the piston divides the bore 14 into a high-pressure chamber 31 and a low-pressure chamber 32 and an axially-spaced, flange portion 33 carries a seal member 34 to prevent leakage from the chamber 32 to the ambient by way of the open end 17. Piston 25 also includes a tapered recess 35 which is adapted to receive a force rod 38. The force rod also communicates with an operator-controlled brake pedal (not shown) in a conventional manner.

A piston cup seal 39 is disposed within the high-pressure chamber 31 adjacent to piston flange 28. The cup seal is fabricated from a wear-resistent, somewhat resilient material, such as Polytetrafluoroethylene, fluorinated ethylenepropylene, or the like, and has a base portion and a peripheral lip portion formed integrally therewith. The cup seal is provided with a centrally-located passageway 59 and an intersecting contoured counterbore 60 which together transpierce the cup seal.

A valve, in this case, a poppet valve 40, is provided to selectively open and close the centrally-disposed cup seal passageway. Fixedly connected to the valve 40 is a spring retainer member 41. The spring retainer engages a spring 45 within the high-pressure chamber 31 and such spring exerts oppositely-directed forces against the retainer 41 and a check valve 42 to urge the retainer 41, the seal 39, and the piston 25 toward the open end 17 of the master cylinder while urging the check valve 42 toward the outlet end 18.

The check valve 42 allows unrestricted fluid flow therethrough in a direction toward the outlet port on a pumping stroke and blocks flow therethrough in a reverse direction until such time as fluid gradually returning from the individual wheel cylinders moves the entire check valve assembly, under certain conditions, away from the outlet end and enables the fluid to pass into the high-pressure chamber 31.

The spring member retainer 41 is provided with a counterbore 46 and a plurality of transpiercing passages 47 which allow fluid flow through the retainer member. Such retainer member is also equipped with a central bore 48 which is adapted to fixedly engage a stem portion 49 of the valve 40 such as by press fitting, staking, or other suitable means.

FIG. 3 in the drawings shows the poppet valve 40 in greater detail. The valve is provided with a small-diameter stem portion 49 and an enlarged portion 52 which includes a plurality of flats 53 and arcuate sections 52 forming, with stem portion 49, a plurality of shoulders 56. A head portion 54 of the valve has a contoured surface 55 which is adapted to coincide with the counterbore 60 of the cup seal 39. With reference to FIGS. 1 and 2, it will be noted that the enlarged portion 52 and the flats 53 penetrate the bore 59 in cup seal 39 and the shoulders 56 abut the retainer member 41.

As shown in FIG. 2, the components of the present invention provide an unobstructed fluid flow path between the chamber 32 and the chamber 31. Such flow path includes a plurality of ports 61 in the piston flange 28, cup seal counterbore 60 and passageway 59, a retainer member counter bore 46 and the transpiercing passages 47.

It should be noted that when stroking force is applied to the piston 25 by means of the force rod 38 to move the piston 25 rightwardly, to the position shown in FIG. 1, the poppet valve 40 and the cup seal 39 are moved, in delayed sequence, towards the outlet end 18 of the pressure chamber 31. When this occurs, the contoured surface 55 of the valve head engages the contoured counterbore 60 in the cup seal and closes off the aforementioned unrestricted flow path. Concurrently with the engagement of the contoured counterbore and the contoured surface of the valve head, a facing portion of the piston flange 28 makes contact with the base of the cup seal. Such action completely discontinues communication between the low-pressure chamber 32 and the high-pressure chamber 31.

As the piston 25 moves to the right, cup seal 39 passes the bypass port 24 and closes off communication between reservoir 12 and chamber 31. Further movement of the piston 25 toward the outlet end 18 causes the spring 45 to compress and the pressure of fluid in the chamber 31 to increase. High-pressure fluid from the chamber 31 begins to be forced out through the port 20 to activate the individual wheel cylinders of the vehicle. Shortly after the poppet valve makes closing contact with the cup seal, the cup seal moves axially past the bypass port 24. This discontinues communication between the high-pressure chamber 31 and the reservoir and causes a rapid increase in pressure in the chamber 31. At such time, the cup seal 39 is forced outwardly by the high fluid pressure into tight sealing engagement with the interior of the master cylinder.

Upon the discontinuance of force applied by the rod 38, the spring 45 immediately begins to force the piston 25, the poppet valve 40, and the retainer 41 leftwardly toward the open end 17 of the master cylinder. This action instantly unseats the poppet valve 40 from sealing engagement with the contoured counterbore 60 and allows pressurized fluid from chamber 31 to be immediately relieved into the low-pressure chamber 32 through the aforementioned unrestricted flow path. As the retainer member 41 moves leftwardly toward the open end 17, under the influence of the spring 45, it will make peripheral contact with the cup seal 39 and will move the seal leftwardly. When this occurs, and when the components have all moved to the point where the flange portion 33 makes contact with the retainer 26, the assemblage comes to a rest in a static or normal condition such as is shown in FIG. 2.

In the event that the cup seal should move leftwardly at a rate fast enough to cause a reduction in pressure in the chamber 31, make-up fluid from chamber 32 can rapidly flow into chamber 31 to increase the pressure therein and avoid a low pressure or cavitation condition. Such a condition would tend to prevent return of the cup seal 39. As previously stated, such flow occurs through the previously-described unrestricted flow path.

In FIGS. 4 and 5, an alternate embodiment, essentially identical in principle and operation to that just described, but having a slightly different construction, is shown. As shown, a valve 65 is provided in lieu of the previously-described valve 40. The valve 65 has a unitary flange portion 66 which serves as a retainer member for the spring 45. In lieu of the flats and head portion of the previously-described valve 40, the valve 65 is provided with a central passageway 68 and a plurality of small radial bores 69 which communicate the interior and exterior of the valve. The stem portion 67 is received within the bore 59 of the cup seal which, in this case, is provided as before with a contoured counterbore 60.

The operation of the master cylinder assembly of FIGS. 4 and 5 is essentially the same as that of the previously-described embodiment. When the assembly is static, as shown in FIG. 5, an unobstructed fluid flow path exists between the chamber 32 and 31 by way of the piston flange ports 61, the bores 69 and the passageway 68 in the valve 65. As pressure is applied to force rod 38, the piston 25 is moved rightwardly toward the outlet end 18 and, since the valve 65 is in contact with the piston 25, such valve is also moved rightwardly. As the valve 65 moves toward the outlet end of the cylinder, the spring 45 is compressed and the stem portion 67 moves within the seal bore 59 to discontinue the transmission of fluids through radial bores 69. Further rightward movement of piston 25 causes the piston flange 28 to contact cup seal 39 and to move it toward the outlet end 18. When the piston 25 contacts the cup seal 39, a closure is created and the flange ports 61 are blocked, thus fluid is trapped within the chamber 31 except for that which leaks through the small bypass port 24. However, additional rightward movement of the piston 25 causes the cup seal to move past the bypass port to completely trap the fluid within chamber 31 wherein the pressure thereof is increased. Such pressurized fluid is expelled through the port 20 to activate the individual wheel cylinders for the vehicle in the previously-described manner.

Upon relaxation of the rightward force applied to the piston 25, the spring 45 forces the valve 65 and the piston 25 leftwardly toward the open end 17 of the cylinder. This movement will immediately create a flow path between the chamber 31 and 32 by way of the passageway 68 and bores 69 in the valve 65. High pressure in the chamber 31 is thereby relieved into the low-pressure chamber 32 to equalize the pressures in such chambers. Further movement of the valve and piston toward the left will cause the valve to contact and pick up the cup seal 39 to move it leftwardly. If such leftward movement of the cup seal is rapid enough to create a partial vacuum in the chamber 31, then fluid from the chamber 32 can flow immediately into the chamber 31 by way of the previously-described flow path. Pressure equalization between the chamber 31, 32 will occur, as previously described, whenever the cup seal is separated from the piston 25.

The cup seal valve may obviously take other forms so long as the function and performance thereof are in keeping with the principles previously discussed. An example of such other valve constructions is shown in FIGS. 6 and 7. The valve 70, like the valve 65, also serves as a retainer member for the spring 45. As did the previously-described embodiments, the valve 70 provides an unrestricted flow passageway. This passageway includes a plurality of equiangularly spaced bores 72 in the retainer portion of the valve and a corresponding plurality of grooves 74 formed along the periphery of the valve stem portion, as shown.

Braking systems incorporating the previously-described master cylinder sealing arrangements may be rapidly and efficiently bled. Such bleeding will cause fluid starvation in chamber 31. At such time, fluid from the reservoir 12 will readily and automatically replenish the needed fluid by flowing from the chamber 32 to chamber 31 by way of the previously-described unrestricted flow paths.

In view of the foregoing, it is readily apparent that the structure of the present invention provides an improved master cylinder piston sealing arrangement which is simple to fabricate and extremely efficient.

While the invention has been described and shown with particular reference to the preferred embodiments, it will be apparent that variations are possible, especially with regard to the particular construction of the cup seal valve, and such variations would fall within the spirit of the present invention which is not intended to be limited except by the scope of the appended claims.

We claim:

1. In a brake master cylinder having piston means slidably disposed within cylinder means, said cylinder means including fluid inlet and outlet means, a sealing arrangement for said piston means comprising; a resilient cup seal freely movable relative to said piston means and not carried thereupon disposed within said cylinder means between said fluid outlet means and said piston means, said resilient cup seal being transpierced by centrally-disposed fluid passageway means, valve means mounted within said fluid passageway means for closing off said passageway means when said resilient cup seal is in a first predetermined position with respect to said piston means and for permitting unrestricted fluid flow through said passageway means when said resilient cup seal is disposed in a second predetermined position with respect to said piston means, first spring means for biasing said valve means toward said piston means, a retainer member adapted to engage said first spring means, and said retainer member being fixed to and movable with said valve means.

2. The invention of claim 1 wherein said valve means include a poppet valve having an enlarged head portion and a stem portion, said passageway means including a contoured counterbore seat portion adapted to engage said enlarged head portion when said resilient cup seal is disposed in said first predetermined position.

3. The invention of claim 1 wherein said valve means include a valve having a hollow body and a plurality of radial passages communicating the interior and exterior of said body and wherein a portion of said passageway means engages and closes off said radial passages when said resilient cup seal is disposed in said first predetermined position and opens said radial passages when said resilient cup seal is disposed in said second predetermined position.

4. The invention of claim 1 wherein said valve means include a valve member having an enlarged portion and an elongated stem portion, said elongated stem portion being slidably disposed within said passageway means, said enlarged portion having a plurality of arcuately spaced axial bores therethrough, said stem portion having a plurality of arcuately spaced axial grooves therein in direct communication with said axial bores, and all of said axial grooves being simultaneously closed off by said piston means when said resilient cup seal is disposed in said first predetermined position.

5. The invention of claim 1 wherein said retainer member directly engages said resilient cup seal when said resilient cup seal is disposed in said second predetermined position, said retainer member having passage means therethrough for permitting said unrestricted fluid flow through said fluid passageway means when said resilient cup seal is disposed in said second predetermined position.

6. The invention of claim 1 wherein said cylinder means include a cylindrical bore formed within a housing member and a fluid supply reservoir, and wherein first and second port means are provided for communicating said bore with said fluid supply reservoir.

7. The invention of claim 6 wherein said first and second port means include respectively a compensating port and a fluid make-up port spaced axially apart from one another along said bore and wherein said outlet means is disposed at one axial end of said bore.

8. The invention of claim 2 wherein said poppet valve is slidably disposed within said fluid passageway means, and wherein said stem portion is in constant engagement with a portion of said resilient cup seal.

9. The invention of claim 8 wherein said stem portion is provided with flat areas of reduced dimension to permit unrestricted fluid flow through said fluid passageway means past said stem portion disposed therein.

10. In a brake master cylinder having a main bore with an outlet end, a reservoir adjacent to said main bore, a fluid make-up port communicating said bore with said reservoir, a piston having a flange portion slidably disposed within said main bore between said make-up port and said outlet end, passage means transpiercing said flange portion, and biasing means within said main bore for urging said piston toward said make-up port, a piston sealing arrangement comprising; a flexible free-floating seal member having a passageway therethrough slidably disposed in said main bore adjacent to said flange portion and separate therefrom, valve means disposed within said passageway and movable with said seal member and also relative thereto, said valve means including retainer means for directly engaging said biasing means, said valve means operative to close said passageway when said seal member is disposed in a first predetermined position with respect to said flange portion and operative to permit fluid flow from said reservoir through said make-up port and passage means and through said passageway when said seal member is disposed in a second predetermined position with respect to said flange portion.

* * * * *